United States Patent
Lee

(10) Patent No.: US 6,665,302 B2
(45) Date of Patent: Dec. 16, 2003

(54) METHOD AND SYSTEM FOR HANDLING A LOOP BACK CONNECTION USING A PRIORITY UNSPECIFIED BIT RATE IN ADSL INTERFACE

(75) Inventor: Kenny Ying Theeng Lee, Duluth, GA (US)

(73) Assignee: Research Investment Network, Inc., Irvine, CA (US)

(*) Notice: Subject to any disclaimer, the term of this patent is extended or adjusted under 35 U.S.C. 154(b) by 134 days.

(21) Appl. No.: 10/063,380

(22) Filed: Apr. 17, 2002

(65) Prior Publication Data

US 2002/0141445 A1 Oct. 3, 2002

Related U.S. Application Data

(63) Continuation of application No. 09/338,917, filed on Jun. 23, 1999.
(60) Provisional application No. 60/090,443, filed on Jun. 24, 1998.

(51) Int. Cl.[7] ............................ H04L 12/28; H04L 12/56
(52) U.S. Cl. ............................ 370/395.42; 370/412
(58) Field of Search .................... 370/395.43, 395.1, 370/395, 395.2, 395.21, 395.4, 395.42, 412, 416, 241–249, 392, 503

(56) References Cited

U.S. PATENT DOCUMENTS

| | | | |
|---|---|---|---|
| 5,748,629 A | | 5/1998 | Caldara et al. |
| 5,754,530 A | | 5/1998 | Awdeh et al. |
| 5,831,980 A | * | 11/1998 | Varma et al. ............... 370/395 |
| 5,953,336 A | * | 9/1999 | Moore et al. ........... 370/395.43 |
| 6,269,082 B1 | * | 7/2001 | Mawhinney et al. ........ 370/247 |
| 6,314,102 B1 | * | 11/2001 | Czerwiec et al. ........... 370/395 |
| 2002/0118691 A1 | * | 8/2002 | Lefebvre et al. ............ 370/419 |

FOREIGN PATENT DOCUMENTS

| | | |
|---|---|---|
| EP | 0 817 433 A2 | 1/1998 |
| EP | 0 843 499 A2 | 5/1998 |
| EP | 0 843 499 A3 | 1/1999 |
| WO | WO 98/06203 | 2/1998 |

OTHER PUBLICATIONS

Marek Bromirski and Jan Haratym, Title: Prioritized state–department buffer–management schemes in ATM switch, 1997 IEEE.

David M. Drury, Title: ATM traffic management and the impact of ATM switch design, 1996, 471–479, Computer Networks and ISDN Systems.

* cited by examiner

Primary Examiner—Wellington Chin
Assistant Examiner—Raj Jain
(74) Attorney, Agent, or Firm—Keiji Masaki; Steve A. Wong; Micah P. Goldsmith

(57) ABSTRACT

A new format for asynchronous transfer mode defines a priority unspecified bit rate format; which uses the same memory structure as that used by the existing UBR and CBR traffic protocols. This format is also used for a loopback operation.

3 Claims, 3 Drawing Sheets

\* = INDICATE THERE IS DATA TO BE TRANSMITTED.
\*_ = INDICATE THERE IS PRIORITY UBR DATA TO BE TRANSMITTED.

METHOD AND SYSTEM FOR HANDLING A LOOP BACK CONNECTION USING A PRIORITY UNSPECIFIED BIT RATE IN ADSL INTERFACE

CROSS REFERENCE TO RELATED APPLICATION

This application claims priority from a co-pending patent application Ser. No. 09/338,917 filed Jun. 23, 1999, which claims priority to Provisional Patent Application Serial No. 60/090,443, filed Jun. 24, 1998.

FIELD OF THE INVENTION

1. Field

The present system teaches a new priority system for asynchronous transfer mode, and an application of that new system to a loop back operation.

2. Background

Asynchronous transfer mode or ATM is a telecommunications protocol that allows packet based transfer of information. Cells of information are sent across an information network defined by a number of nodes. The information is sent from node-to-node.

An ATM transport network (i.e., a communication network, which transmits information using ATM cell packets) is known to include an ATM layer and a physical layer. The ATM layer is based on the virtual path/virtual channel (VP/VC) concept. The VC identifies a unidirectional communication capability through which ATM cells are transported. One or more virtual channels (VCs) can be used in a particular virtual path (VP), which also identifies another level of the communication capability through which the ATM cells are transported.

An ATM cell is the smallest information unit. It includes a header field of 5 bytes or octets, and a payload field of 48 bytes or octets. The header field includes VP and VC identifiers. These identifiers are used for routing the information to an intended destination.

Communication in known ATM networks is initiated during a connection setup, after which cells belonging to one connection follow a predetermined path defined by the VPI and VCI on a particular link. The connection control information transferred during setup utilizes a unique Signaling VC (SVC) which is included in the VP. The SVC is identified by the virtual path ID (VPI) and virtual channel ID (VCI).

Cells destined for many different end points are sent over a single physical communications circuit. The header of each cell includes a channel identifier, which is used to control the routing of the cell through the ATM system. The channel identifier determines routing of the cell.

In a typical ATM system there are 256 possible VPIs and 65,536 possible VCIs; thus, there are 16,777,216 possible channel identifiers (VPI/VCIs). One of the many challenges in designing an ATM network is how to handle this huge number of corrections.

Specified traffic control protocols are used to determine the routing of the information. The routing is controlled using conventional addressing techniques.

Further details of ATM are well known in the art. In addition, different flavors and sub-types of ATM are known, including digital subscriber line ("DSL"), asymmetric digital subscriber line ("ADSL"), and other flavors of digital subscriber line ("XDSL").

In all of these communication modes, a message is broken into multiple portions or cells. A conventional ATM system breaks the total message to be sent over ATM into 48 byte data portions. A typical data message might be, for example, 1500 bytes in length. Hence, the 1500 byte message is divided up into 31 of the 48 byte cells.

Specified traffic control protocols are used to determine the routing of the information. The routing is controlled using conventional addressing techniques.

ATM has the ability to provide a guaranteed quality of service. This compares with other information services, which have no such guarantee. Data packages are subdivided into classes of services. The ATM switches prioritize each data packet routing based on the quality of service.

Conventional quality of service classes include substantially constant bit rate ("CBR"), variable bit rate ("VBR") and unspecified bit rate ("UBR"). These classes are based on ITU recommendation 1.371 entitled Traffic Control, congestion control in BSIDN and on version 4.0 of "the Traffic Management specification". Connection data transmission rates may be set on a semi-permanent basis depending the requirements for the connection.

One very good quality of service is CBR or constant bit rate. The data is guaranteed to arrive at a constant rate. The ATM switches along the virtual path prioritize the data packages. The CBR traffic gets priority over the remaining traffic. Therefore, even if there is one or more congested switches, the CBR still gets through quickly.

UBR, or unspecified bit rate is at the other end of the scale as compared with CBR. There is no guarantee about when the data will arrive at the destination.

Other classes of service have been defined by the ATM forum. However, these can require extensive and complicated handling by the ATM switch. Examples include AVR (available variable rate) or VVR (variable variable rate). Each requires that the ATM switch be significantly reconfigured to handle the new requirements.

SUMMARY OF THE INVENTION

The present specification defines another quality of service class for such a communication connection. The present system uses the relatively simple interface of CBR/UBR to provide an intermediate form of service using the same memory infrastructure as in CBR/UBR. In particular, the present system defines a class of service that accommodates loop back within an ATM network. This intermediate form of service enables an unspecified bit rate, which can provide protection against backlog in a congested switch, without giving of priority over all other parts.

BRIEF DESCRIPTION OF DRAWINGS

These and other aspect will now be described in detail with respect to the accompanying drawings, wherein.

DETAILED DESCRIPTION

The disclosed mode as described with reference to FIGS. 1–3 describes a switch architecture and includes a new quality of service for use in an ATM network. This new quality of service is called priority unspecified bit rate or priority UBR. This new priority UBR class also enables a testing mode that gives a more accurate test of the network, using a loop back condition that gauges the message handling capability of a UBR system.

Figure 1:
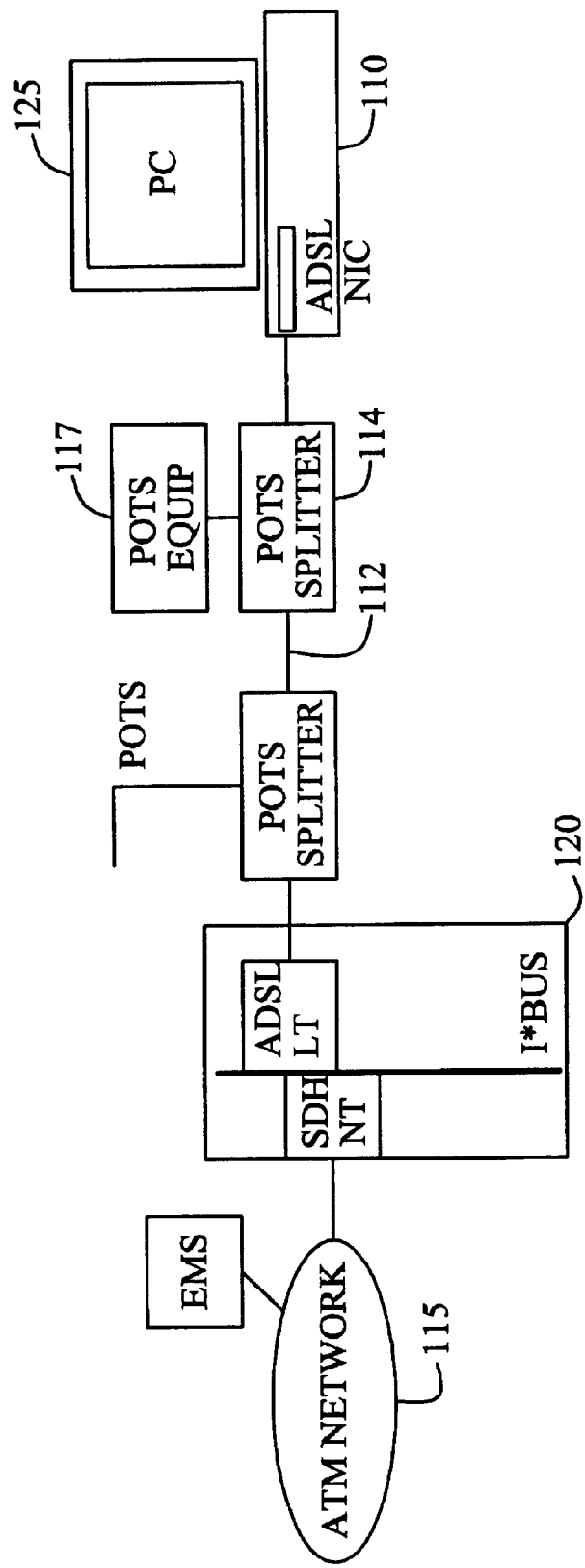
FIG. 1 shows a general network architecture of the present system.

The overall block diagram of the general network architecture is shown in FIG. 1. The embodiments described herein can operate as part of an ATM system. An ADSL interface card for communicating with an ADSL network is described. More generally, however, this system can operate within any system that carries out data communication by dividing a total message into separate addressed packets, or more specifically in an asynchronous transfer mode system.

A PC 125 is, for example, an Internet service provider that provides Internet service to a number of users 98, 99, and others that are not shown. PC 125 includes an ADSL network interface card or "NIC" 110. NIC 110 connects to the telephone line 112 via a plain old telephone system (POTS) splitter 114. Other POTS equipment 117 can include conventional telephone equipment.

A conventional ATM subscriber access multiplexer or "ASAM" 120 connects from telephone line 112 to ATM network 115. The ASAM 120 multiplexes a number of communications via the ATM network 115. In this system, the NIC 110 becomes a node connecting to the ATM network 115, which allows routing to other nodes, such as second node 150. While only one second node 150 is shown, the ATM network is typically connected to literally thousands of other nodes shown generally in FIG. 1. Any of the multiple nodes can send or receive a message. The connection among these nodes are based on their VCI/VPI identifiers.

Node 1 receives a number of cells that will form ATM messages.

The ADSL NIC 110 forms a node on the network. This node, like other nodes, is capable of handling connections that include CBR and UBR data within a timing slot ring. The timing slot ring could alternatively be physically located elsewhere in the network.

Figure 2A:
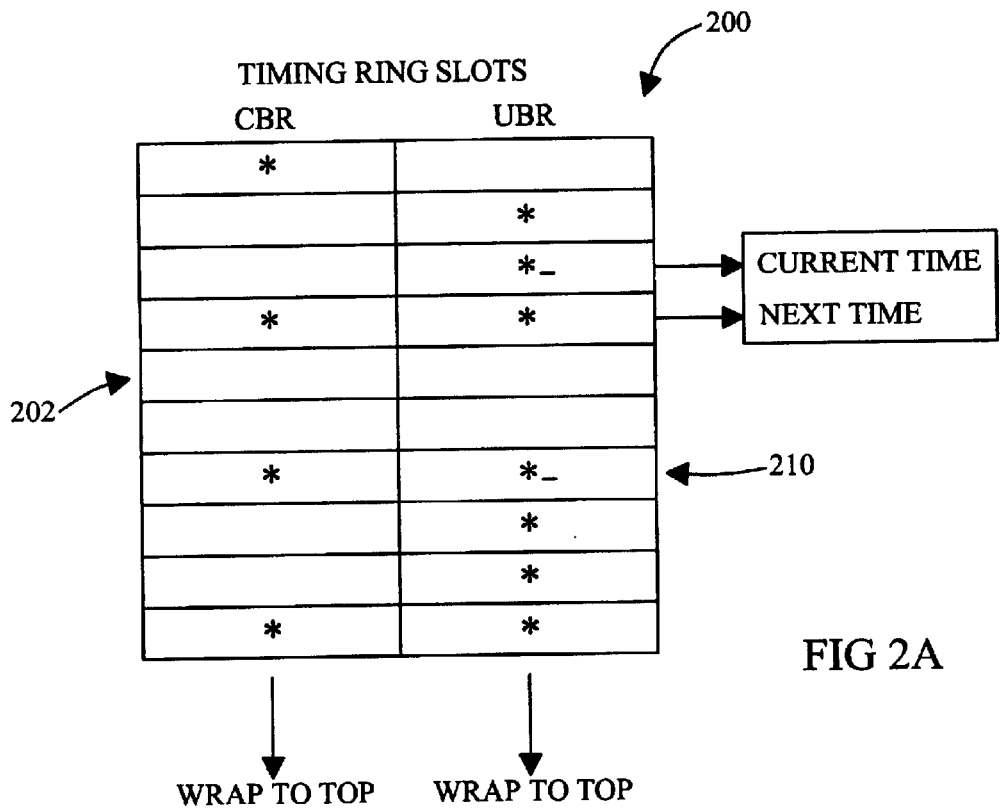
FIGS. 2A and 2B show the timing ring as well as the transmit buffer associated with the timing ring according to one embodiment of the present invention.

FIG. 2A shows the timing slot ring (or buffer) 200 that is used to hold data to be sent or information indicative thereof. The timing slot can be stored in 110 or in memory associated with a processor. This can be in the NIC 110 or in PC 125 or in any node or switch. The buffer 200 is assembled to have data in an order that enables it to be sent at a desired time. The timing slot ring is investigated at each time slot. Data is transmitted at that time slot according to its priority.

According to the present system, a special flag is added to certain UBR timing slots 210. This flag provides those items of UBR data with priority within the timing slot ring 200. This flag may be included, for example, within the header field of each data packet to identify the accompanying payload field as containing priority UBR data. This flagged data becomes priority UBR.

Each timing slot can have CBR data and/or UBR data as shown. The asterisk within each time slot indicates there is data to be transmitted from that time slot. CBR data is put into the beginning (head) of a first queue 202. Any UBR data is put at the end (tail) of a second queue 210.

Figure 2B:
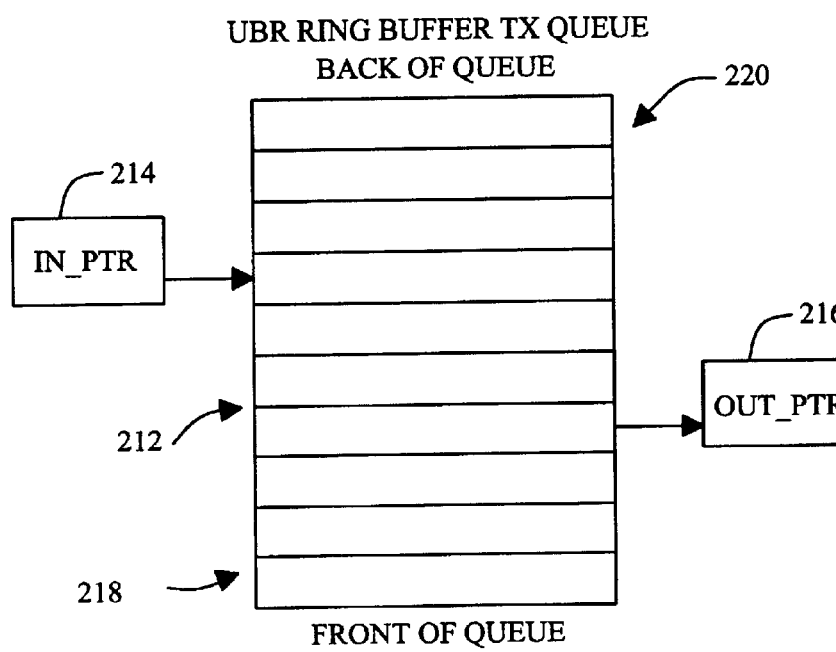

If UBR data is present in a time slot, the UBR data is copied to a UBR queue 212, shown in FIG. 2B. UBR queue 212 is a buffer or an array used for transmitting UBR data from timing slot ring 200. The procedure for copying UBR data from timing slot ring 200 into UBR queue 212 and transmitting it therefrom is discussed below with reference to FIG. 2B. If CBR data is present in a time slot, either exclusively or in conjunction with UBR data, the CBR data is transmitted immediately from timing slot ring 200. UBR queue 212 has a first pointer (in_ptr) 214 to indicate the location in which UBR data is to be stored in the buffer and a second pointer (out_ptr) 216 to indicate the location in the buffer which data is to be transmitted from. For a more efficient use of UBR queue 212, a pointer to the address of the UBR data within timing slot ring 200 may be copied to UBR queue 212, instead of copying the UBR data packet itself into UBR queue 212. This will minimize the size of the buffer required for UBR queue 212.

Figure 3:
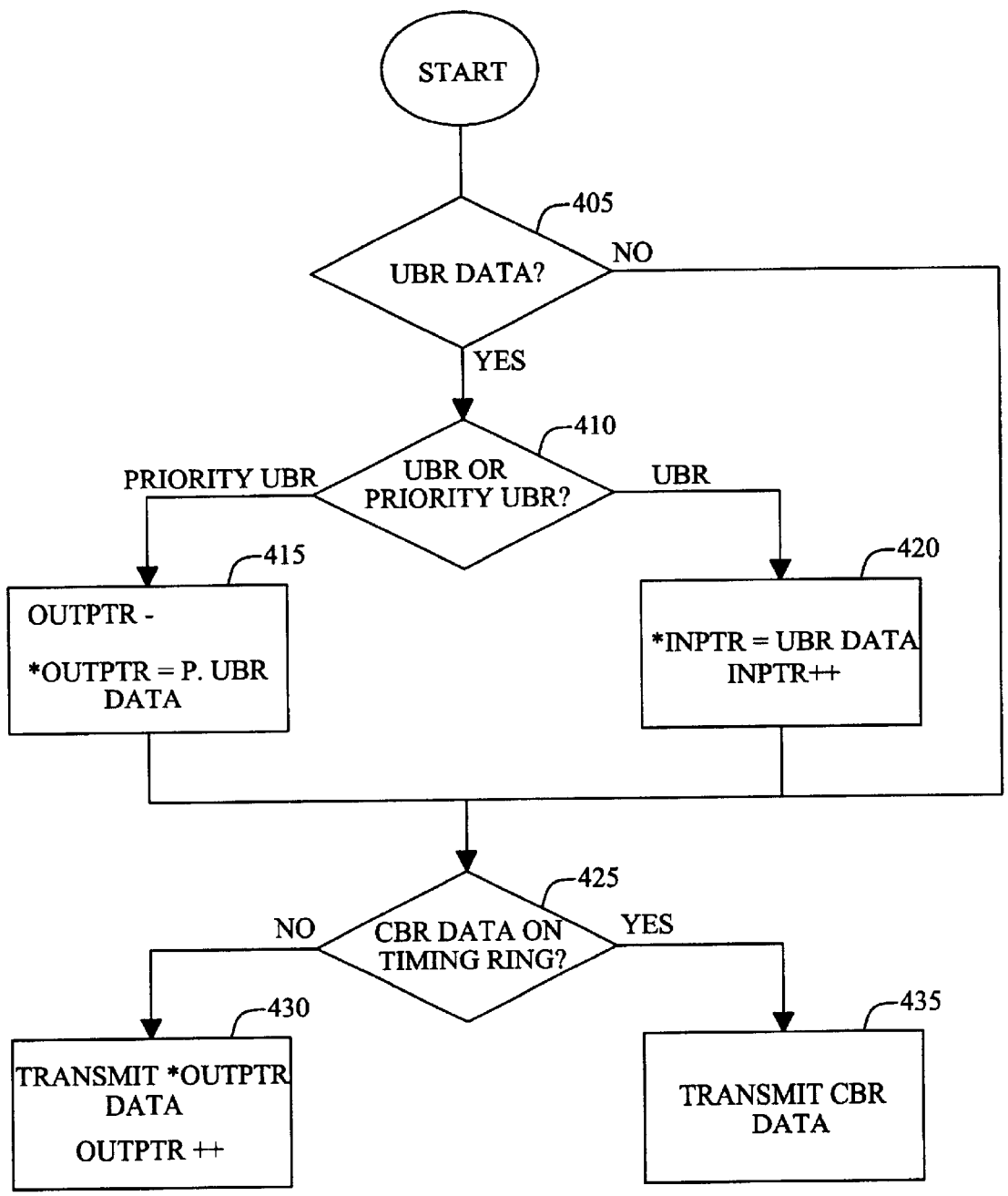
FIG. 3 shows a flowchart of operation to handle different priority information.

FIG. 3 is a flow chart showing steps taken by an embodiment of the present invention. This flowchart can be carried out in software, hardware defined by hardware definition language (HDL), firmware, or combinations thereof. This is most advantageously carried out within the modem software of the ADSL NIC 110.

The operation starts at step 405 where the system first determines whether the current data is UBR data. If the data is UBR data, flow proceeds to step 410, which determines if the data is regular UBR data or priority UBR data (P-UBR). The two classes are handled differently, as described above.

If the data is P-UBR, step 415 represents the procedure for sending the data or its address to UBR queue 212. Out_ptr is decremented by moving towards the front (or head) 218 of UBR queue 212. The P-UBR data or its address is then assigned to the address of out_ptr 216. If at step 410, it is determined that the data is UBR data, step 420 represents the procedure for sending the UBR data or its address to UBR queue 212. In this instance, the UBR data or its address is assigned to the address of in_ptr 214. In_ptr 214 is then incremented toward the back (or tail) 220 of UBR queue 212.

If at step 405 there is no UBR data detected, the flow proceeds to step 425 which detects whether there is CBR data in the timing ring slot 200. A positive detection of CBR data in the timing ring causes that CBR data to be transmitted at step 435.

If there is no CBR data in the timing ring, (or after all the CBR data has been sent) the flow proceeds to step 430 which transmits the output data located at the address of out_ptr 216. Out_ptr 216 is then incremented towards the back (tail) 220 of UBR queue 212 to transmit the next UBR data packet in the sequence. It can therefore be seen that when in_ptr 214 is greater than out_ptr 216, namely positioned further toward the back 220 of UBR queue 212, it is an indication that there is data to be transmitted.

In this way, using the existing memory structure and data structure, an additional class of information can be processed. This class of information is handled after the constant bit rate data, but is not left at the end of the queue where it can be seriously delayed by a congested switch. Rather, this becomes the first UBR data to be sent.

In essence, the priority UBR data will always be handled before conventional UBR data but still after CBR data. Importantly, however, this creates a new class of service using the existing timing slot ring structure that is already used for CBR/UBR data. One application of this new class is for allowing certain network testing. A specific loop back connection is described for testing purposes, for example. A node, such as node 125, may request to test characteristics of the system. The test can be carried out by sending a message to a specified location, along with a command that some response be sent back. This is conventionally called loop back. The amount of time it takes for a message to come back gauges the speed of the system. The mere fact that a message returns indicates that the system is at least working correctly.

However, a very congested switch can skew the response. For example, one congested switch could hold the UBR data for an inordinate amount of time, especially if there is a lot of CBR data at that same switch.

According to this system, a loop back command is sent with an indication that it is priority UBR data. Hence, this loop back command is handled before any of the UBR data. However, this command does not interfere with the CBR data. In addition, since this command does not interfere with the CBR data, it further gives a more realistic view of a network's loading. If CBR data is taking a long time, the priority UBR data will also take a long time. However, a highly congested switch will not skew the values, since this priority UBR data will pass that highly congested switch as fast as any UBR data could so pass it.

The present system describes the ring being stored within a memory associated with a processor. This shows the timing slot ring being formed of two side by side queues. Of course, a single queue could be used. In this case CBR data is put at the front 218 of one queue and UBR data is put at the back 220 of the same queue. The priority UBR data is placed in the middle.

Similarly, in place of two queues, a third queue could be defined, one for CBR, one for UBR and one for priority UBR.

Although only a few embodiments have been described in detail above, other embodiments are contemplated by the inventor and are intended to be encompassed within the following claims.

What is claimed is:

1. A method of testing in a packet based communication system, comprising:

using a first unspecified class of service for information packets, which is not guaranteed, but which has priority over other packets of unspecified bit rate classes of service;

using a first and second array in a timing ring wherein said first array is for packets of constant bit rate classes of service and said second array is for packets of unspecified bit rate classes of service; and using said first unspecified class of service for loopback testing comprising sending a packet of said first unspecified class of service from said timing ring to a specified location and determining an amount of time before an indication of receipt is received from said specified location.

2. A method for testing data traffic within a broadband system comprising the steps of:

flagging a designated UBR packet to create a priority UBR (P-UBR) packet;

sending said designated P-UBR packet to a timing slot ring for sequential transmission wherein said timing slot ring includes a first and second array wherein said second array is for said designated P-UBR packet as well as other UBR packets and said first array is for one or more CBR packets;

sending a message from said timing slot ring to a specific location using said designated P-UBR packet;

receiving a response from said specific location in said timing slot ring indicating said P-UBR packet has been received; and determining the amount of time between sending said message and receiving said response to said message.

3. A system for testing data traffic within a broadband system comprising:

a designated UBR packet that is flagged to create a priority UBR (P-UBR) packet;

a timing slot ring wherein said designated P-UBR packet is sent to said timing slot ring for sequential transmission wherein said timing slot ring includes a first and second array wherein said second array is for said designated P-UBR packet as well as other UBR packets and said first array is for one or more CBR packets;

a message that is sent using said designated P-UBR packet to a specific location;

a response that is received from said specific location indicating said message was received; and a timer for determining an amount of time between sending said message and receiving said response to said message.

* * * * *